(12) United States Patent
Allen et al.

(10) Patent No.: US 7,530,051 B1
(45) Date of Patent: May 5, 2009

(54) METHOD AND APPARATUS FOR DIMENSIONAL ANALYSIS ENCODED IN METATYPES AND GENERICS

(75) Inventors: Eric E. Allen, Burlington, MA (US);
David R. Chase, Belmont, MA (US);
Victor M. Luchangco, Cambridge, MA (US); Jan-Willem Maessen, Somerville, MA (US); Guy L. Steele, Lexington, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 876 days.

(21) Appl. No.: 11/034,636

(22) Filed: Jan. 13, 2005

Related U.S. Application Data (60) Provisional application No. 60/620,795, filed on Oct. 21, 2004.

(51) Int. Cl.
*G06F 9/44* (2006.01)
*G06F 9/45* (2006.01)
(52) U.S. Cl. ............... 717/108; 717/107; 717/114; 717/116; 717/140; 717/148
(58) Field of Classification Search .............. None
See application file for complete search history.

(56) References Cited

U.S. PATENT DOCUMENTS 5,930,798 A * 7/1999 Lawler et al. ............... 707/102
6,173,276 B1 * 1/2001 Kant et al. .................. 706/50
6,879,926 B2 * 4/2005 Schmit et al. ............... 702/123

OTHER PUBLICATIONS

E. Allen, J. Bannet, and R. Cartwright, "A First-Class Approach to Genericity", In Proceedings of the Eighteenth Annual SIGPLAN Conference on Objected-Oriented Systems, Languages, and Applications, Anaheim, CA, Oct. 2003. (19 pages).
E. Allen, R. Cartwright, and B. Stoler, "Efficient Implementaion of Run-time Generic Types for Java". In IFIP WG2.1 Working Conference on Generic Programming, Jul. 2002. (pp. 1-28).
G. Baldwin, "Implementation of Physical Units". SIGPLAN Notices, V. 22(8). Aug. 1987 (pp. 45-50).
G. Bracha, D. Griswold, "Strongtalk: Typechecking Smalltalk in a Production Environment". In Proceedings of the Eighth Annual SIGPLAN Conference on Object-Oriented Programming, Systems, Languages and Applications, Oct. 1993, (pp. 215-230).

(Continued)

*Primary Examiner*—Chuck O Kendall
(74) *Attorney, Agent, or Firm*—Osha • Liang LLP (57) ABSTRACT

In general, in one aspect, the invention relates to a method for integrating dimensional analysis in a program comprising defining a specific dimension class within the program, wherein the specific dimension class is an instance of the dimension meta-class, defining an instantiation of a unit class within the program, wherein the instantiation of the unit class comprises the specific dimension class as a type parameter associated with the instantiation of the unit class, defining a method within the program using the instantiation of the unit class and the specific dimension class, and compiling the program to generate an executable code corresponding to the program, wherein the program is written in an object-oriented language.

35 Claims, 5 Drawing Sheets

OTHER PUBLICATIONS

W. Brown, "Applied Template Metaprogramming in SIUnits: the Library of Unit-Based Computation". In Proceedings of the Second Workshop on C++ Template Programming, Aug. 2001, (17 pages).

R. Cartwright and G. Steele, "Compatible Genericity with Run-Time Types for the Java Programming Language". In Proceedings of the Thirteenth Annual SIGPLAN Conference on Object-Oriented Systems, Languages, and Applications, Vancouver BC, Oct. 1998, (15 pages).

A. Dreiheller, M. Moerschbacher, B. Mohr. "PHYSCAL: Programming Pascal with Physical Units". SIGPLAN Notices, V. 21(12), Dec. 1986, (pp. 114-123).

D. Ferrucci, C. Welty. "What's in an Instance?". RPI Computer Science Technical Report, 1994, (9 pages).

D. Isbell, D. Savage. "Mars Climate Orbiter Failure Board Release Report, Numerous NASA Actions Underway in Response". NASA Press Release 99-134, Nov. 10, 1999, (3 pages).

N. Gehani. "Databases and Units of Measure". IEEE Transactions on Software Engineering, vol. SE-8, No. 6, Nov. 1982, (pp. 605-611).

P. Hilfinger. "An Ada Package for Dimensional Analysis". ACM Transactions on Programming Languages and Systems, vol. 10, No. 2, Apr. 1988, (pp. 189-203).

M. Karr, D.B. Loveman III. "Incorporation of Units into Programming Languages". Communications of the ACM, 21(5), May 1978, (pp. 385-391).

A. Kennedy, "Dimension Types". In Proceedings of the 5th European Symposium on Programming Languages and Systems, Edinburgh, U.K., Apr. 1994, (15 pages).

A. Kennedy, "Programming Languages and Dimensions". PhD Thesis., St. Catharine's College, Nov. 1995, (163 pages).

A. Kennedy, "Relational Parametricity and Units of Measure". In Proceedings of the 24th Annual ACM Symposium on Principles of Programming Languages, Paris, France, Jan. 1997, (pp. 442-455).

Peter J. Stuckey, Martin Sulzmann, Jeremy Wazny, "Interactive Type Debugging in Haskell". In Proceedings of the 2003 ACM SIGPLAN Workshop on Haskell, Uppsala, Sweden, Aug. 2003 (pp. 72-83).

* cited by examiner

METHOD AND APPARATUS FOR DIMENSIONAL ANALYSIS ENCODED IN METATYPES AND GENERICS

CROSS-REFERENCE TO RELATED APPLICATIONS

This application claims benefit under 35 U.S.C. § 119(e) from Provisional Application No. 60/620,795 filed on Oct. 21, 2004, entitled "METHOD AND APPARATUS FOR DIMENSIONAL ANALYSIS ENCODED IN METATYPES AND GENERICS".

STATEMENT REGARDING FEDERALLY SPONSORED RESEARCH OR DEVELOPMENT

This invention was made with United States Government support under Contract No. NBCH020055 awarded by the Defense Advanced Research Projects Administration. The United States Government has certain rights in the invention.

BACKGROUND

Dimensions, units, and measurements are commonly used computational constructs in science and engineering. Accordingly, computer programs used in the science and engineering fields perform calculations using variables which are implicitly associated with dimensions and units. Traditionally, physical quantities (e.g., length=5 meters) were represented as numbers that correspond to the quantities' measurement in a particular unit (e.g., a length represented as a number of meters). Further, the unit and dimension of the measurement are typically only represented in the computer program in the names of variables used to hold these numbers.

As programming languages have evolved, the support for associating a unit and a dimension with a particular measurement has improved. For example, certain object-oriented languages have included support for encoding dimensions as ad hoc language features. An alternative to the ad hoc encoding of dimensions is to use a fixed set of dimensions. On such implementation of using the fixed set of dimensions is the SIUnits Library implemented in C++ via the Standard Template Library (See, for example, W. Brown. "Applied Template Metaprogramming in SIUnits: the Library of Unit-Based Computation." *In Proceedings of the Second Workshop on C++ Template Programming*, October 2001.).

The aforementioned SIUnits Library supports checking of quantities expressed in the SI (Système International d'unités) system by encoding a quantity as one of seven dimensions addressed by the SI system as integer parameters of a template class Quantity. Under this approach, the parametric dimensions, class relationships between units, dimensions, quantities (i.e., measurements) are pre-defined.

There have also been a few attempts to integrate support for associating a unit and a dimension with a particular measurement into more general type systems. These approaches have focused on modifying structural type systems which have significantly different design considerations than those of mainstream object-oriented languages (See, for example, A. Kennedy, "Dimension Types," *In Proceedings of the 5th European Symposium on Programming Languages and Systems*. Edinburgh, U.K., 1994.)

SUMMARY

In general, in one aspect, the invention relates to a method for integrating dimensional analysis in a program comprising defining a specific dimension class within the program, wherein the specific dimension class is an instance of the dimension meta-class, defining an instantiation of a unit class within the program, wherein the instantiation of the unit class comprises the specific dimension class as a type parameter associated with the instantiation of the unit class, defining a method within the program using the instantiation of the unit class and the specific dimension class, and compiling the program to generate an executable code corresponding to the program, wherein the program is written in an object-oriented language.

In general, in one aspect, the invention relates to a compiler comprising functionality to compile a program, wherein the program comprises a specific dimension class, wherein the specific dimension class is an instance of a dimension meta-class, an instantiation of a unit class, wherein the instantiation of the unit class comprises the specific dimension class as a type parameter associated with the instantiation of the unit class, and a method within the program using the instantiation of the unit class and the specific dimension class, wherein compiling the program to generates an executable code corresponding to the program, and wherein the program in written in an object-oriented language.

In general, in one aspect, the invention relates to a computer readable medium comprising software instructions to compile a program, wherein the program comprises a specific dimension class, wherein the specific dimension class is an instance of a dimension meta-class, an instantiation of a unit class, wherein the instantiation of the unit class comprises the specific dimension class as a type parameter associated with the instantiation of the unit class, and a method within the program using the instantiation of the unit class and the specific dimension class, wherein software instructions to compile the program comprise software instructions to statically check the program using the type parameter associated with the instantiation of the unit class, wherein the program in written in an object-oriented language.

In general, in one aspect, the invention relates to a method for integrating dimensional analysis in a program comprising instantiating a dimension class using a dimension meta-class, instantiating a unit class comprising the instantiated dimension class as a type parameter associated with the instantiation of the unit class, and executing a method within the program using the instantiated unit class and the instantiated dimension class, wherein the program is written in an object-oriented language.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency. Further, the use of "ST" in the drawings is equivalent to the use of "Step" in the detailed description below.

In the following detailed description of embodiments of the invention, numerous specific details are set forth in order to provide a more thorough understanding of the invention. In other instances, well-known features have not been described in detail to avoid obscuring the invention.

In general, embodiments of the invention provide a method and system for integrating dimensions and units with classes in an object-oriented programming language (e.g., C++, Java™ Programming Language (Java™ is a trademark of Sun Microsystems, Santa Clara, Calif.), C#, etc.). Further, embodiments of the invention provide a method and system for allowing a compiler to perform dimensional analysis on the dimensions, units, and measurements used in the program (i.e., a collection of class definitions) to ensure that the dimensions, units, and measurements are correct (e.g., that a given value is expressed in the correct units). In addition, embodiments of the invention provide functionality to enable the compiler to treat dimensions and units as ordinary class-based types. Moreover, the embodiments of the invention provide functionality to support polymorphism (i.e., an object-oriented program's ability to process objects differently depending on their type or class). More specifically, embodiments of the invention support both parametric polymorphism and inheritance polymorphism.

In one embodiment of the invention, integrating dimensions and units into an object-oriented programming language includes augmenting object-oriented languages. Specifically, in order to capture the dual nature of dimensions and units as both values and types, embodiments of the invention generalize the concept of class inheritance. Further, embodiments of the invention allow a class to be an instance of another class. Further, the resulting instance classes (i.e., class defined as instances of other classes) may be used by the program as if the instance classes are statically defined values. Moreover, embodiments of the invention allow a particular instance class to contain additional instance classes, and also allow classes to extend instance classes. Further, in embodiments of the invention, classes and instance classes are checked for safety in a class-based static type system with nominal subtyping.

The aforementioned functionality is implemented using the various programming language constructs discussed below. Those skilled in the art will appreciate that the invention is not limited to the programming constructs used herein. Programs defined using embodiments of the invention include meta-classes and/or references to a Dimension Library including meta-classes. In one embodiment of the invention, a meta-class is either a user-defined class or a special meta-class such as class, abstract class, or interface. In one embodiment of the invention, all classes which are meta-classes have instance classes defined in separate declarations. For example, a programmer may define a meta-class Dimension and two instance classes: length and time, as follows.

abstract class Dimension { }
    Dimension Length { ... }
    Dimension Time { ... }

In the above example, Length and Time are instance classes of Dimension. Further, Dimension is a meta-class denoted by the keywords abstract class. In addition, Length and Time are both of kind Dimension. Further, Dimension is of kind abstract class.

Embodiments of the invention also provide functionality to define type parameters and also to specify the kind of a type parameter. For example, generic classes (i.e., a mechanism to specify a class type whose exact type is not known until a concrete class of the generic class is instantiated) of Unit and Measurement may be defined in the following manner.

class* Unit<Dimension D> extends D { ... }
    class Measurement<Dimension D, Unit<D> U> extends D { ... }

In the above example, Unit is of kind class* and has a type parameter of Dimension. In one embodiment of the invention, keyword class* is used to designate a class whose instances are all instance classes. Continuing with the example, Measurement is of kind class and has type parameters of Dimension and Unit. In addition, both Unit<D> and Measurement<D,U> extend their dimension D, allowing a programmer to refer to the type D in places where the program expect measurements of D (e.g., the program may define a method m that takes a Length and calls m with new Measurement<Length, Mile> (5), denoting 5 Miles). Thus, in view of the above definition of the Unit class, all instance classes of Unit are associated with a particular Dimension and all instance classes of Measurement are associated with a particular Dimension and Unit. Those skilled in the art understand that a mixin class is a class designed specifically to be blended with other classes through multiple inheritance. Further, those skilled in the art will understand that mixin classes typically add specific functionality through additional methods and are not meant to be instantiated on their own.

The following instances classes of the Unit class (from the previous example) may be now be defined in the following manner.

Unit<Time> Minute { ... }
    Unit<Length> Foot { ... }
    Unit<Length> Mile { ... }

As defined in the example, class Minute is an instance class of Unit and has a type parameter of Time. Similarly, class Foot is an instance class of Unit and has a type parameter of Length, and class Mile is an instance class of Unit and has a type parameter of Length. Thus, by including the dimension (i.e., Time, Length, etc.) as a type parameter, each instance class of Unit is bound to the particular dimension without having to explicitly include an extra unit reference in each instance of the class. Further, as shown above, the inclusion of dimension and unit as type parameters in each instance class of the Measurement class (i.e., Measurement<D,U>) enables the instances classes of Measurement to be bound to a particular dimension and a particular unit.

Continuing with the discussion of programming constructs, in one embodiment of the invention, naked type parameters (i.e., a type parameter that does not occur as part of the instantiation of a parametric type. For example, in a context binding type parameter T, an occurrence of T as the type of a field f is a naked type parameter, whereas an occurrence of T in a type instantiation Unit<T> is not a naked type parameter) occurring in an extends clause or as a kind of a type parameter must be instantiated only with classes that contain a zeroary constructor (i.e., a constructor with no arguments) and no abstract methods (thereby ensuring there is a superconstructor to call and that a mixin class will not accidentally inherit abstract methods without defining them). In view of the above, because the Unit class and the Measurement class are both mixin classes and both have a superclass type parameter of kind Dimension, they implicitly require that all instance classes of Dimension include a zeroary constructor.

The discussion to this point has focused on general class relationships and class headers in accordance with embodiments of the invention. The following discussion focuses on the contents of the aforementioned classes. Specifically, in one embodiment of the invention, if a given class is an instance class of another class (e.g., a meta-class), then all members of the meta-class (i.e., methods and fields/data members) are static members of the instance class (i.e., they are not members of instance classes instances, but are instead members of the instance class when treated as a value). If a given class is an instance of another class that declares abstract methods, then the instance class must define each inherited abstract method as a static method.

Further, in one embodiment of the invention, an instance class may define both a static method and an instance method of the same name. In such an instance class, according to one embodiment of the present invention, references to the static method from the instance context must explicitly denote a receiver. In one embodiment of the invention, the receiver of the static method may be any legal type, including a type parameter (discussed above). Further, in one embodiment of the invention, the static members of such an instance class define the members of that instance class when it is treated as a value. However, static members are not members of a class' instances, nor are the static members inherited by subclasses.

As described above, instance class fields/data members (e.g., members) must be designated as static. Fields for a class are typically initialized by calling the constructor of the class. Similarly, in one embodiment of the invention, instance fields of a meta-class inherited as static fields by a given instance class are initialized by the instance class in a single call to a constructor of the meta-class occurring in a static block. For example, an instance class of the Measurement class called CircumferenceOfEarth may include the following constructor.

Measurement<Length,Mile> CircumferenceOfEarth {
static { container(24889); }
}

In the above example, the keyword container designates the call to a constructor of the meta-class Measurement<Length, Mile>. Further, the single static field magnitude (inherited from the meta-class) of the CircumferenceOfEarth class is initialized with a value of 24889. In addition, because the CircumferenceOfEarth class is parameterized by the unit of Mile, a compiler performing static checking on a program containing the above code portion would understand the value 24889 is a dimension of length and in a unit of miles. Those skilled in the art will appreciate that if an instance class does not have a constructor such as the one shown above, then the instance class is viewed as having the following constructor: static {container ( );}.

In one embodiment of the invention, the aforementioned instance classes can be assigned to fields or variables and passed as arguments to methods, provided that an instance class passed as an argument is an instance class of the variable's type. In general, a variable may be bound to either an instance class or an ordinary (non-class) instance. Further, field accesses and method calls to a variable bound to an instance class are interpreted as accesses to static members of the instance class. In addition, in one embodiment of the invention, a variable typically may not be used in type contexts (e.g., the type of a method parameter or the type specified in a cast operation), even if the variable is bound to an instance class. However, a type parameter (e.g., Unit, Dimension, etc) of kind K (where K represents, for example, Dimension, class, abstract class, etc.) may be used in all type contexts. Further, type parameter of kind K may also be used in any context requiring a value of class K. Moreover, the type parameter may be assigned to variables of class K and instance methods of K may be called on the variables of class K.

Using the aforementioned programming constructs as a foundation, the following additional features may be implemented. One such feature is the concept of a PrimaryUnit class of kind Unit and parameterized by a particular dimension. The introduction of a PrimaryUnit class allows a user to define the primary units of a particular dimension. Further, the introduction of a PrimaryUnit class also allows a user to easily specify unit conversions (discussed below). In addition, the PrimaryUnit class allows a programmer to avoid cyclic dependencies of unit definitions. The following is an example of the header for a generic PrimaryUnit class in accordance with one embodiment of the invention.

final* Unit<D> PrimaryUnit<Dimension D> { . . . }

In the above example, the PrimaryUnit class is of kind final* Unit<D> and is parameterized with the type parameter Dimension. Further, in accordance with one embodiment of the invention, the use of the keyword final* denotes that the PrimaryUnit class has no subclasses or instances. The parameterization of the generic PrimaryUnit class with the Dimension type parameter ensures that each dimension has only one primary unit. In one embodiment of the invention, the PrimaryUnit class associated with a particular dimension may be implemented as follows: alias Meter=PrimaryUnit<Length>, where the alias is used to identify the primary units in a manner readily ascertainable by a user.

As mentioned above, the PrimaryUnit class also enables a user to readily convert between different units for a given dimension (e.g., from meters to feet, etc.). In particular, by using a PrimaryUnit class, a programmer only needs to define conversions between a given unit and the primary unit (as defined in the PrimaryUnit class). In this way, the programmer does not need to maintain conversions between all possible combinations of units, thereby reducing the amount of code necessary to implement unit conversions while retaining the functionality.

Another feature that may be implemented using the programming constructs discussed above is an Abelian class. In one embodiment of the invention, Abelian classes are meta-classes that provide a general language extension to support algebraic manipulation. Similar to classes denoted with the kind class*, classes denoted as abelian class may only have instance classes. In one embodiment of the invention, abelian classes are parameterized with an identity element, a binary operator, and a repetition operator. In one embodiment of the invention, the repetition operator (used to define dimensions and units raised to a particular power (e.g., $Time^{-2}$) is given higher precedence than the binary operator (used to define the combinations of dimensions and units by multiplication (e.g., Length * Time). In one embodiment of the invention, the identity operator enables a program to represent dimensionless values.

In one embodiment of the invention, the identity element designates the instance class that serves as the identity of the group (i.e., all instances classes of the abelian class). More specifically, in the context of abelian groups (from which the abelian class derives its name), there exists an identity element (i) in the abelian group (A) such that for every element (a) within the abelian group (A), a+i=a. Applying the identity element definition to dimensional analysis, as implemented in accordance with one embodiment of the invention, the identity element is implemented as an instance class of the abelian class and used by the compiler during static-type checking to verify correct use of dimensions, units, measurements, etc. In one embodiment of the invention, identity element for an abelian class is implemented using the dimension Unity, which is an instance class of a Dimension.

In one embodiment of the invention, the inclusion of the aforementioned repetition operator and binary operator allows a programmer to express individual dimensions such as Length, Time, etc. as well as dimensions such as Length*Time$^{-2}$. The following is an example of a Dimension class defined as an abelian class and three instance classes of the Dimension class     abelian class (*,^)<Unity> Dimension { ... }
    Dimension Unity { ... }
    Dimension Length { ... }
    Dimension Time { ... }

In the above example, the class Dimension is an abelian class and has an identity element of Unity. Further, the following instance classes of Dimension are defined: Unity, Length, and Time. Because Dimension is defined as an abelian class, the Dimension class automatically includes classes resulting from algebraic combination of the explicitly defined classes, such as Length*Time$^{-2}$, etc.

Another feature that may be implemented using the programming constructs discussed above is zero quantities. In one embodiment of the invention, zero quantities may be associated with a given measurement (i.e., an instance of a measurement class) by creating a Zero class of kind Measurement <D,U> and parameterized by Dimension and Unit. Using this approach, the magnitudes of the measurements associated with the particular instance classes of Measurement would be restricted to non-zero values and the aforementioned Zero class would represent the zero values for the particular instance class of Measurement.

Alternatively, in one embodiment of the invention, zero quantities may be expressed as a wildcard instantiation of the generic Measurement class. More specifically, if T<C> is a generic type, then C can be instantiated with a wildcard, written T<*>. Using the aforementioned instantiation, then an instance of T<*> is an instance of all instantiations of T. Thus, using the wildcard instantiations, the zero quantity may now be defined in the following manner.

Measurement<*,*> Zero { ... }

The instantiation of the zero quantity using the above wildcard instantiation the zero quantity may be viewed as a single polymorphic zero quantity that is an instance of all instantiations of the generic Measurement class.

Another feature that may be implemented using the programming constructs discussed above is the ability to specify that all instances of a given meta-class are subtypes of that meta-class. In one embodiment of the invention, the aforementioned functionality is denoted using the extends* keyword. The following class headers provide an example using the extends* keyword,     abstract class LivingThing { ... }
    abstract class Species extends* LivingThing { ... }
    Species Human extends LivingThing { ... }
    Species Lion extends LivingThing { ... }

In the above example, the LivingThing is a meta-class. Further, Species is also a meta-class that extends LivingThing and the header of Species denotes that all instances of Species are subtypes of LivingThing. Thus, instance classes Human and Lion are of kind Species, extend (in the normal context of extending classes as known in the art) the LivingThing class. Further, instance classes Human and Lion are both are subtypes of LivingThing.

Another feature that may be implemented using the programming constructs discussed above is the ability to declare that all instances of a meta-class define a set of arithmetic methods. In one embodiment of the invention, the aforementioned functionality is denoted using the keyword implements*. In one embodiment of the invention, if implements* is used in the meta-class header, then each instance of the meta-class must implement an interface (i.e., portion of code defining method signatures to be implemented) that includes a set of arithmetic operations. The following in an example of method signatures for an interface for the Dimension meta-class in accordance with one embodiment of the invention.

D add(D x);
    D subtract (D x);
    <Dimension E> D*E multiply(E x);
    <Dimension E> D*E^-1 divide(E x);

In the above example, method signatures define headers for an add operation and a subtract operation both of kind D (a Dimension) that take a variable of type D as input. Further, the method signatures of the interface include a multiply operation and a divide operation that take a variable of type E as input. Further, the resulting type of the value of the multiply and divide operation includes a combination of Dimension D and Dimension E, with the particular combination depending on the arithmetic operation.

In one embodiment of the invention, an interface associated with the meta-class is parameterized in a manner that allows the interface (when implemented by an instance class) to be bound to the particular type of the meta-class. For example, an interface for the Dimension meta-class may be defined as follows:

interface DimensionI<DimensionI<This> This> {
    <Unit<This> U> Measurement<This,U> in Unit( );
    This add(This x);
    This subtract(This x);
    <Dimension That> This*That multiply(That x);
    <Dimension That> This*That^-1 divide(That x);
    }

In the above example, an interface (DimensionI) is defined. The interface is parameterized with the type parameter This which is used to denote that the interface is of the type of the instance class of the dimension. Further, every occurrence of D in the previous code sample has been replaced with This, and every instance of E has been replaced with That.

Using the above refinement of the header of the Dimension interface (DimensionI) and the refined method signatures previously shown, the following header for the Dimension class may now be used:

abelian class (*,^)<Unity> Dimension<Dimension<This> This> implements* DimensionI<This>{ ... }

In the above header for the Dimension meta-class, the Dimension meta-class is designated as an abelian class and, accordingly, is parameterized with a binary operator and a repetition operator as well as the identity element (i.e., Unity). Further, the Dimension meta-class is bound to a type of itself (denoted by This). In addition, every instance class of the Dimension meta-class must implement the interface DimensionI, where DimensionI is bound to a particular instance class of the Dimension meta-class. Using the above header for the Dimension meta-class, the following are examples of headers for instance class of the Dimension meta-class.

Dimension<Length> Length { ... }
    Dimension<Time> Time { ... }

Figure 1:
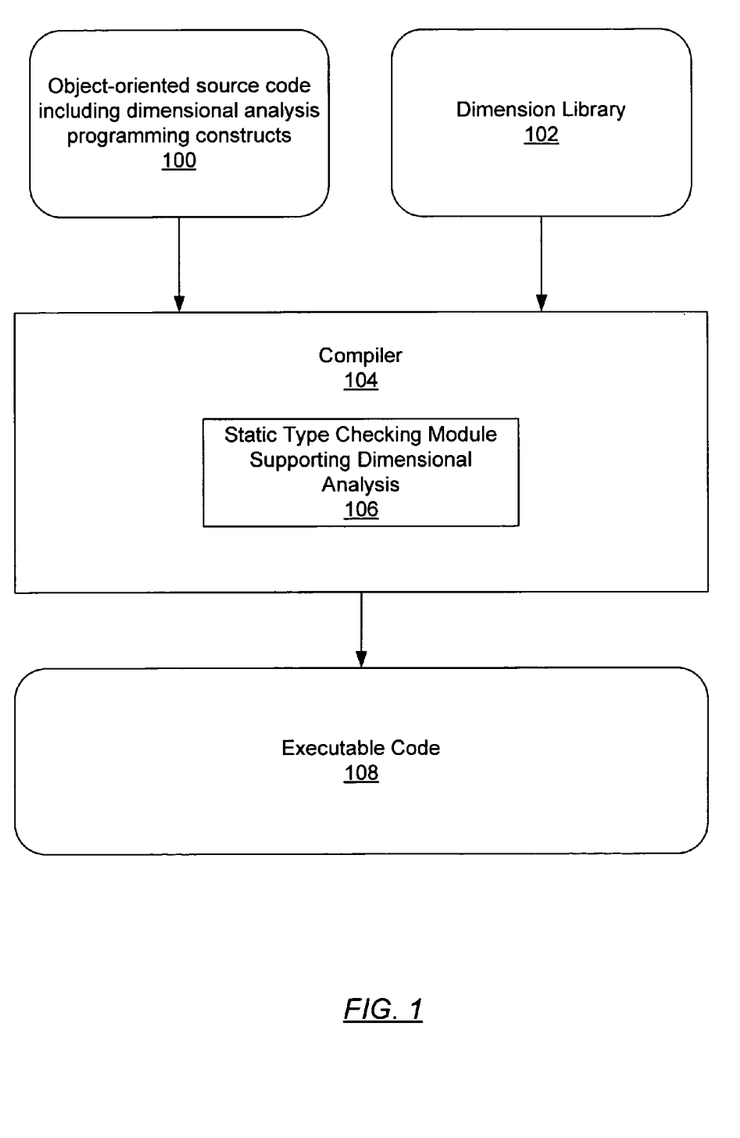
FIG. 1 shows a system in accordance with one embodiment of the invention.

The aforementioned programming constructs and features may be used to define a program including dimensions, units, and measurements. FIG. 1 shows a system for implementing the aforementioned programming constructs, in accordance with one embodiment of the invention. The system includes a compiler (104) which takes object-oriented source code including dimensional analysis programming constructs (as described above) (hereinafter "source code") (100) and a corresponding Dimension Library (102) as input and generates executable code (108) as output. In one embodiment of the invention, the Dimension Library (102) may include, a generic Unit class, a generic Measurement class, and a generic Dimension class. Further, the Dimension Library (102) may also include a generic Dimension Interface. In one embodiment of the invention, the executable code (108) may correspond to any type of executable code including, but not limited to, bytecode, a program binary, etc.

In one embodiment of the invention, the compiler (104) includes a static type checking module that enables dimension checking (hereafter static type-checking module) (106). More specifically, in one embodiment of the invention, the static type-checking module (106) includes the necessary functionality to understand the aforementioned programming constructs and enforce the type rules associated with the aforementioned programming constructs. In this manner, the static type-checking module (106) is able to statically check the units and dimensions used in the source code (100). By performing static type checking on the source code (100) prior to generating the executable code (108), a programmer can be confident that the resulting executable code (108) uses the units and dimensions properly. If the source code (100) uses units and/or dimensions incorrectly, based on the type rules described above, the compiler (104) will generate an error signifying that one or more instances of units, dimensions, etc. are being used incorrectly.

Figure 2:
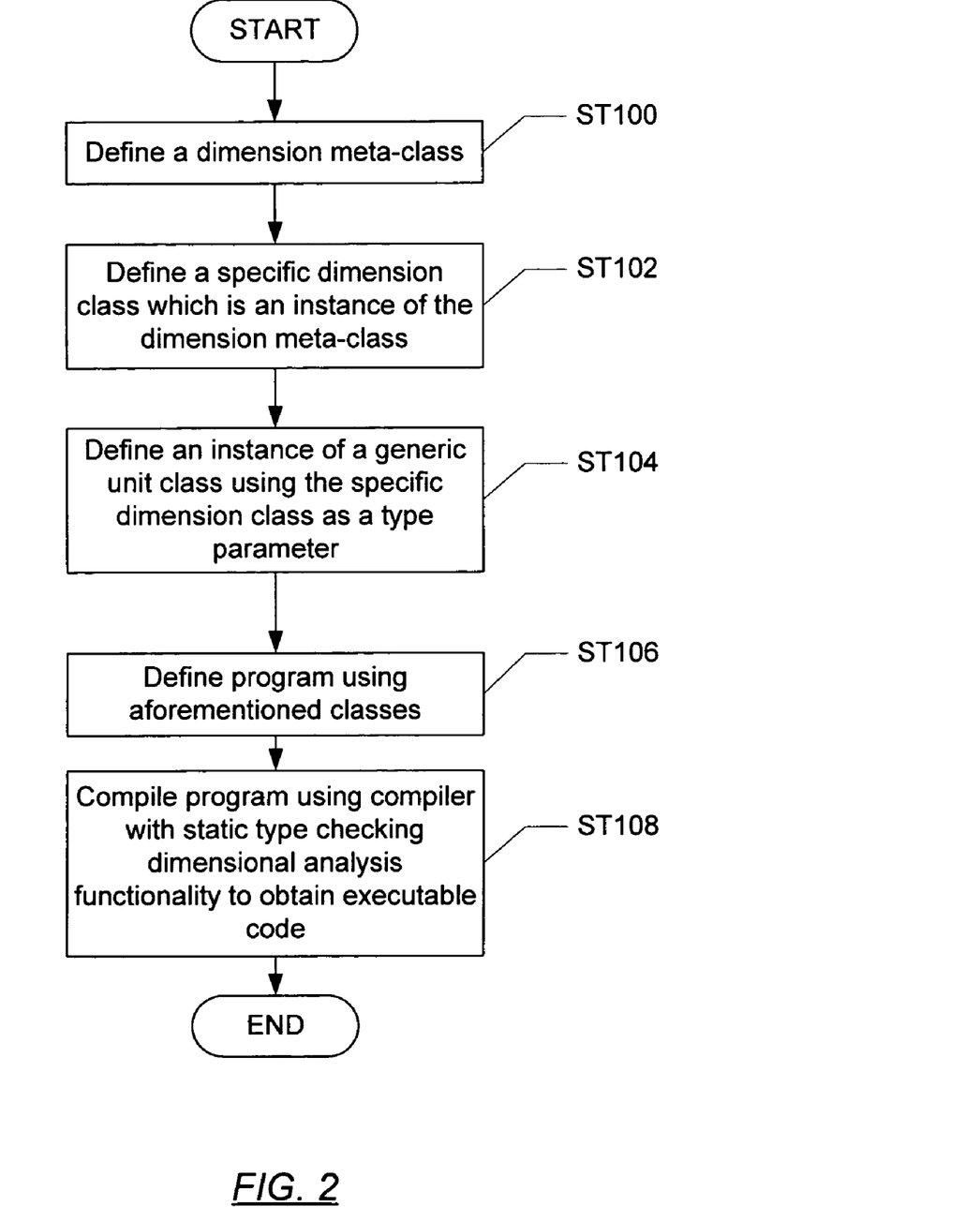
FIG. 2 shows a flowchart in accordance with one embodiment of the invention.

FIG. 2 shows a flow chart for defining a program, which includes the aforementioned programming constructs, in accordance with one embodiment of the invention. Initially, a programmer defines a dimension meta-class (ST100). Those skilled in the art will appreciate that instead of defining the Dimension meta-class, the programmer may obtain a dimension library (as described above) which includes the Dimension meta-class. After defining (or obtaining the Dimension Library containing the Dimension meta-class), the programmer proceeds to define a specific dimension (e.g., Dimension Time { . . . }) which is an instance (or more specifically, an instance class) of the dimension meta-class (ST102).

The programmer then proceeds to define an instance (or more specifically, an instance class) of a generic unit class (typically defined in the Dimension Library 102, described above with respect to FIG. 1) using the specific dimension class as a type parameter (e.g., Unit<Time> Second) (ST104). At this stage, the programmer includes the minimal set of programming constructs necessary to represent units and dimensions in the program. Those skilled in the art will appreciate that one or more of the aforementioned steps may be repeated to obtain the necessary number of dimensions, units, etc. required in the program.

Once the instances of the aforementioned classes including dimensional analysis programming constructs have been defined, the programmer may proceed to define the program using the aforementioned classes (ST106). Those skilled in the art will appreciate that ST106 may include implementing the programming language features described above (e.g., defining a PrimaryUnit class, etc.). For example, the programmer may define an instance (or more specifically, an instance class) of the generic measurement class (typically defined in the Dimension Library, described above) using the specific dimension (defined in ST102) and the instance of the generic unit class (defined in ST104) as type parameters (e.g., Measurement <Time, Seconds>). Once the programmer has completed the source code (100) for the program, the programmer proceeds to compile the aforementioned source code using a compiler (such as 104 as described in FIG. 1) that includes functionality to statically type check the units and dimensions used in the program to ensure that the units and dimensions have been used correctly (based on the type rules discussed above). If the source code (100) is successfully compiled (i.e., the type rules discussed above are all satisfied), the executable code (108) is generated (ST108). Those skilled in the art will appreciate, that if static type checking in the compiler (104) locates an error in the usage of the units and/or dimensions then the compiler (104) will generate an error.

Figure 3:
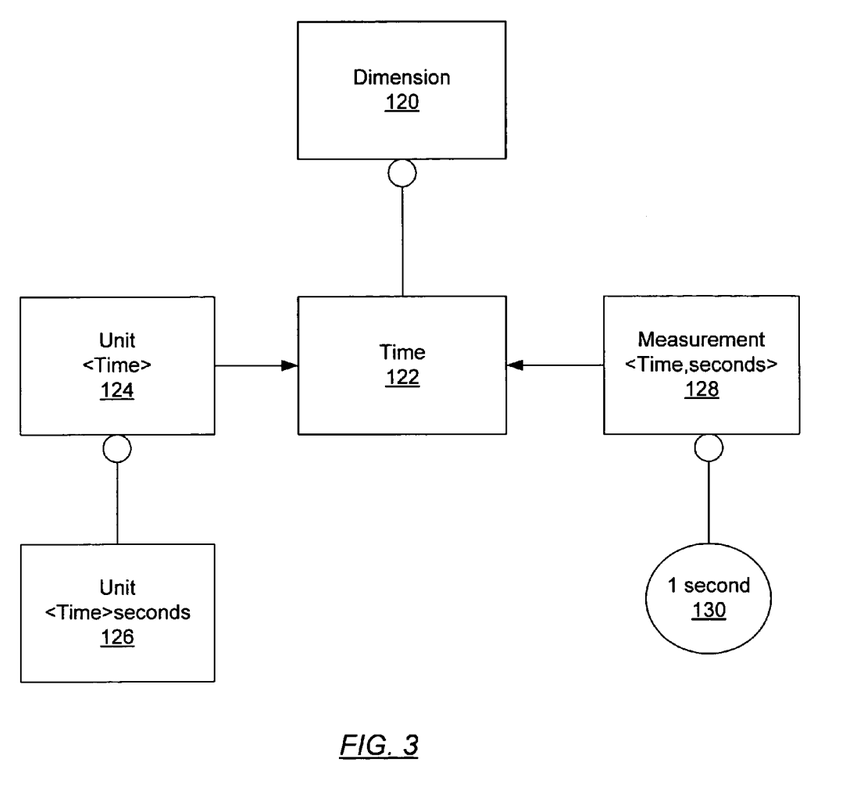
FIG. 3 shows a class diagram in accordance with one embodiment of the invention.

FIG. 3 shows a class diagram corresponding to the example used in explaining FIG. 2 in accordance with one embodiment of the invention. As described in ST100 of FIG. 2, the programmer typically obtains a Dimension meta-class, for example, from a Dimension Library (102). The Dimension meta-class is shown in FIG. 3 as Dimension (120). Further, as described in ST102 of FIG. 2, the programmer defines an instance class of the Dimension meta-class. In this example, Time (122) in FIG. 3 represents an instance class of Dimension (120). As described in ST104 of FIG. 2, the program using the specific dimension as a parameter, may also define an instance of a unit class. In this example, FIG. 3 shows Unit<Time> Second (126) is an instance class of unit parameterized by Time (124), which is in turn a sub-class of Time (122). The instance of the Unit class parameterized by the specific dimension may also be used in a corresponding instantiation of class Measurement (i.e., Measurement <Time, second> (128)). The programmer may then define non-class instances of the measurement class that represent specific measurements (i.e., 1 second (130)).

As previously described, in accordance with embodiments of the invention, the compiler (104) includes functionality enabling static checking of the units and dimensions used within a given program. In one embodiment of the invention, statically type checking units and dimensions within the program includes comparing the units and/or dimensions (using the associated type parameters) associated with classes, variables, methods, field, etc. to ensure that the units and/or dimension match. In one embodiment of the invention, if the program includes members of an abelian class, then the members (i.e., units and/or dimensions which are instances of the abelian class) are preprocessed to convert the members into canonical form. Once the members are expressed in canonical form, the members may be compared directly to determine type equivalence using, for example, syntactic equivalence.

Figure 4:
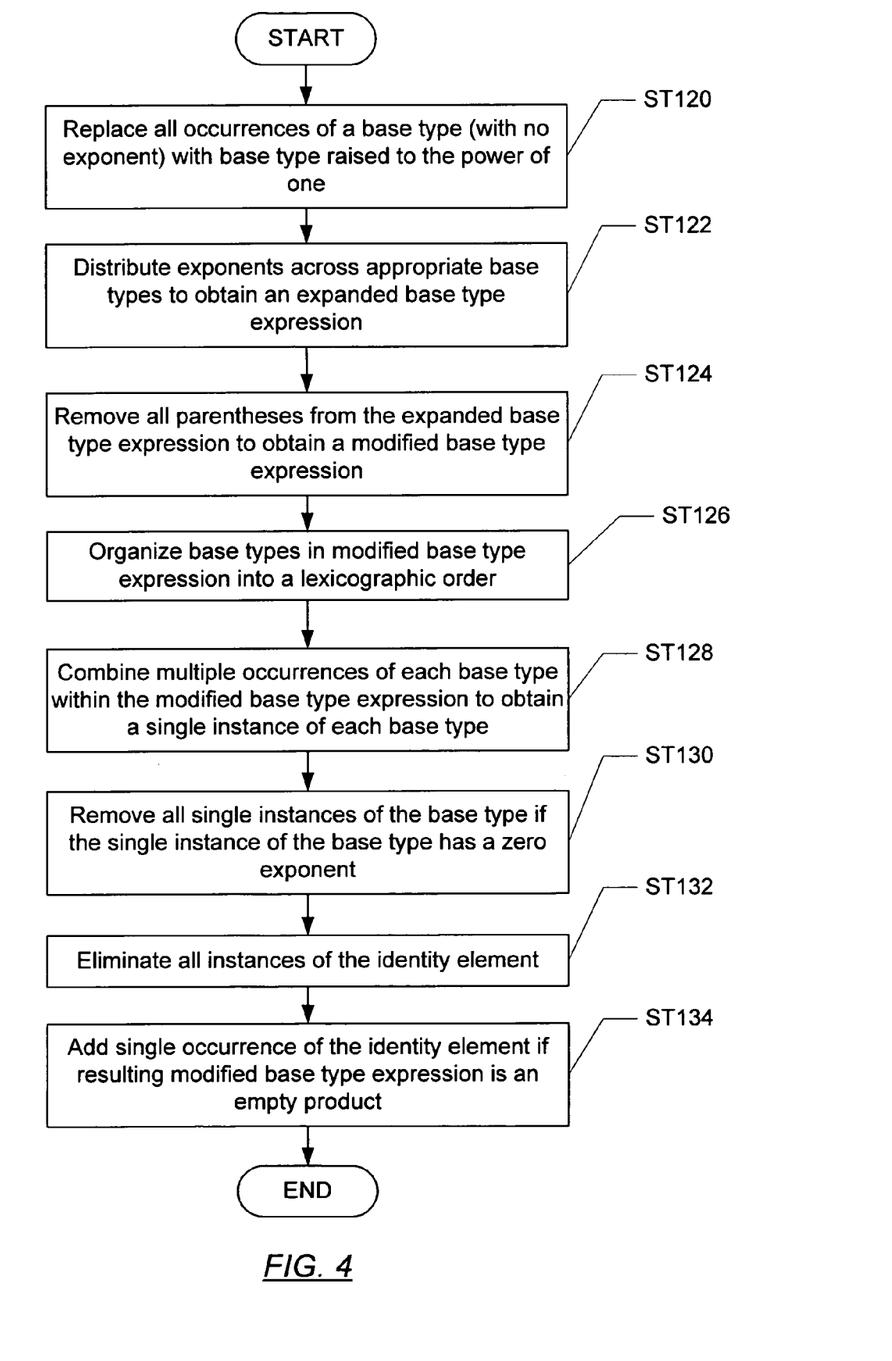
FIG. 4 shows a flowchart in accordance with one embodiment of the invention.

FIG. 4 shows a flowchart for converting a member of an abelian class into canonical form, in accordance with one embodiment of the invention. Initially, all occurrences of a base type (no exponent) are replaced with the base type raised to power of one (ST120). The remaining exponents defined in the member are then distributed across the appropriate base types to obtain an expanded base type expression (ST122). All parentheses from the expanded base type expression are subsequently removed to obtain a modified base type expression (ST124). The base types in modified base type expression are then placed into a lexicographic order (ST126). Multiple occurrences of each base type within the modified base type expression are then combined to obtain a single instance for each base type. (ST128). All single instances of the base types that have a zero exponent are removed (ST130). All instances of the identity element of the corresponding abelian class are also eliminated (ST132). Finally, a single occurrence of the identity element is added if resulting modified base type expression (from ST132) is an empty product (ST134).

The following shows an example of converting a member of an abelian class have a dimension: $(Length^2*Time^{-2}*Unity)^4*Length^{-8}*Time^8$ into canonical form using the method shown in FIG. 4 (note the step references in the example correspond to step references used in FIG. 4).

(ST120) $(Length^2 * Time^{-2} * Unity^1)^4 * Length^{-8} * Time^8$
(ST122) $(Length^8 * Time^{-8} * Unity^4) * Length^{-8} * Time^8$
(ST124) $Length^8 * Time^{-8} * Unity^4 * Length^{-8} * Time^8$
(ST126) $Length^8 * Length^{-8} * Time^{-8} * Time^8 * Unity^4$
(ST128) $Length^0 * Time^0 * Unity^4$
(ST130) Unity
(ST132) $\epsilon$
(ST134) Unity The following is an example of a program using units and dimensions in accordance with one embodiment of the invention. In the example, the program calculates the time dilation of a spacecraft traveling to Proxima Centauri at 99% the speed of light. Those skilled in the art will appreciate that the results of the calculation will depend on the choice of primary units. The example defines source code necessary to perform the calculation if an astrophysicist created the source code. This example illustrates the benefit of defining methods specific to particular dimensions (e.g., dilate defined with the Time Dimension) and benefits associated with parametric polymorphism used in defining Dimensions (e.g., parametric polymorphism in the signature of Quantities.sqrt).

Initially, the program includes a set of primary units. In the example, speed and time are used as Dimensions. Further, the primary unit of speed is SpeedOfLight and the primary unit of time is Second. The following code defines the primary units of Speed and Time.

alias SpeedOfLight = PrimaryUnit<Speed>;
alias Second = PrimaryUnit<Time>;

Using the aforementioned Dimensions, an alias for dimension Length may be defined in the following manner.

alias Length = Speed * Time;

Using the above formulation, all instances of Length will be understood to be shorthand for Speed* Time.

An instance of the Unit<Length>, namely, Meter may now be defined. Because Length is a combination of dimensions Time and Second, the primary unit of Length is implicitly the light second. Thus, the constructor for Meter must define meters with a magnitude corresponding to meters divided by light seconds.

Unit<Length> Meter {
static { container(1/299792458.0); }
}

Further, the programmer may also define Year (a unit with parameter type of Time) in terms of seconds (which is the primary unit of time) as follows:

Unit<Time> Year {
static { container(31556926); }
}

In addition, the programmer may also define Lightyears (a unit with parameter type of Length) in terms of years and the speed of light. Because the definition of LightYears uses years and speed of light, a conversion factor is required. In the particular example, the conversion factor is required to be of type Unity (i.e., the identity element) so that the static type checking may verify that the conversion factor is correct. Accordingly, the product of the speed of light times a year is divided by the product of the primary units of speed and time. In view of the above, Lightyears is defined in the following manner.

```
Unit<Length> Light-years {
    static {
        container (
            (SpeedOfLight.multiply<Time>(Year)) .divide<S
                peed * Time>
                (SpeedOfLight.multiply (Second)
        );
    }
}
```

In addition, in order to calculate the dilation of the spacecraft a square root method that is polymorphic with respect to the dimension of its argument is required. The following portion of the code may be used to define the square root method.

class Quantities {
<Dimension D> static D sqrt(D^2 q) { ... }

Note that the body of the square root method could be a simple call to Math.sqrt( ) with an unwrapped magnitude as its argument. At this stage, all the basic components of the program necessary to write the method to calculate the dilation of the spacecraft have been defined. The dilate method implements the following formula: Time Dilation=Passage of Time Measured by stationary observer*

$$\sqrt{-\frac{v^2}{c^2}}.$$

The following code defines the dilate method.

```
Dimension Time {
    Time dilate (Speed v) {
        return this.multiply<Unity> (
            Quantities.sqrt.<Unity> (
                new Double (1).subtract   (
                    v.multiply<Speed> (v) .divide<Speed^2>
                        (SpeedOfLight.multiply<Speed>
                        (SpeedOfLight)
                )
            )
        );
    }
}
```

In the above code sample, the class Time is of kind Dimension and includes a method dilate of kind Time. The method dilate take a variable v of type speed as input and returns a value of time dilation of type Unity. Note that the use of the keyword "this" in the above method corresponds to the Passage of Time Measured by stationary observer and code included in the Quantities.sqrt<Unity>{ ... } corresponds to $$\sqrt{1-\frac{v^2}{c^2}}.$$

The following section describes the type checking of the body of dilate method in accordance with one embodiment of the invention. At the outset, because the square root method (defined above) is instantiated with dimension Unity, the argument of the square root method must also be of dimension Unity (noting that Unity²=Unity). The argument of the square root method is itself an expression. The expression is $$1 - \frac{v^2}{c^2}$$

with the new Double (1) corresponding to 1. Though not explicitly discussed, assume that the dimension of the expression will be of dimension Unity if the sub-expression (i.e., $$\frac{v^2}{c^2})$$

is also of dimension Unity.

With respect to the sub-expression, the sub-expression is a division of v.multiply(v) by the SpeedOfLight.multiply (SpeedOfLight). Since v is of dimension Speed, the resulting multiply( ) operation has dimension Speed². Further, SpeedOfLight has dimension Speed (as initially defined), thus SpeedOfLight.multiply(SpeedOfLight) has dimension Speed². Accordingly, when v.multiply(v) is divided by the SpeedOfLight.multiply(SpeedOfLight) the resulting dimension is Unity. Thus, the dilation method passes type checking. Note that if this sub-expression had not been of dimension Unity (for example, if the programmer neglected to divide by the square of the speed of light), the enclosing application of subtraction would not have passed type checking.

Using the aforementioned dilate method, the time required to travel to Proxima Centauri may now be calculated using the following code.

Length travelDistance = new Double(4.22).multiply<Length> (Light-years);
Speed shipsSpeed = new Double(0.99).multiply<Speed> (SpeedOfLight);
Time earthTime = travelDistance.divide<Speed> (shipsSpeed);
Time shipsTime = earthTime.dilate(shipsSpeed);

The following summarizes the type checking involved for the aforementioned portion of code. With respect to the traveDistance variable, because new Double(4.22) is a quantity of dimension Unity, the multiply method with an argument of dimension Length may be used to obtain the travelDistance with the resulting value being of dimension Length. The same reasoning may be used to explain the type checking for the shipsSpeed. With respect to the earthTime variable, the earthTime variable is of dimension Time. Because travelDistance has dimension Length and shipsSpeed has dimension Speed (which corresponds to Length/Time), the result of the call to the divide( ) operation will be a value with dimension Time. Finally, the shipsTime variable has a dimension of Time, thus the result of applying the dilate operation must produce a value having the dimension Time. Because the dilate operation produces a result of dimension Time, calling dilate on shipsSpeed with a dimension of speed returns the product of this.multiple<Unity> where this is earthTime with a dimension of Time. Since multiplying the dimensions Unity and Time produces a value with dimension Time, the shipsTime will have the correct dimension.

Figure 5:
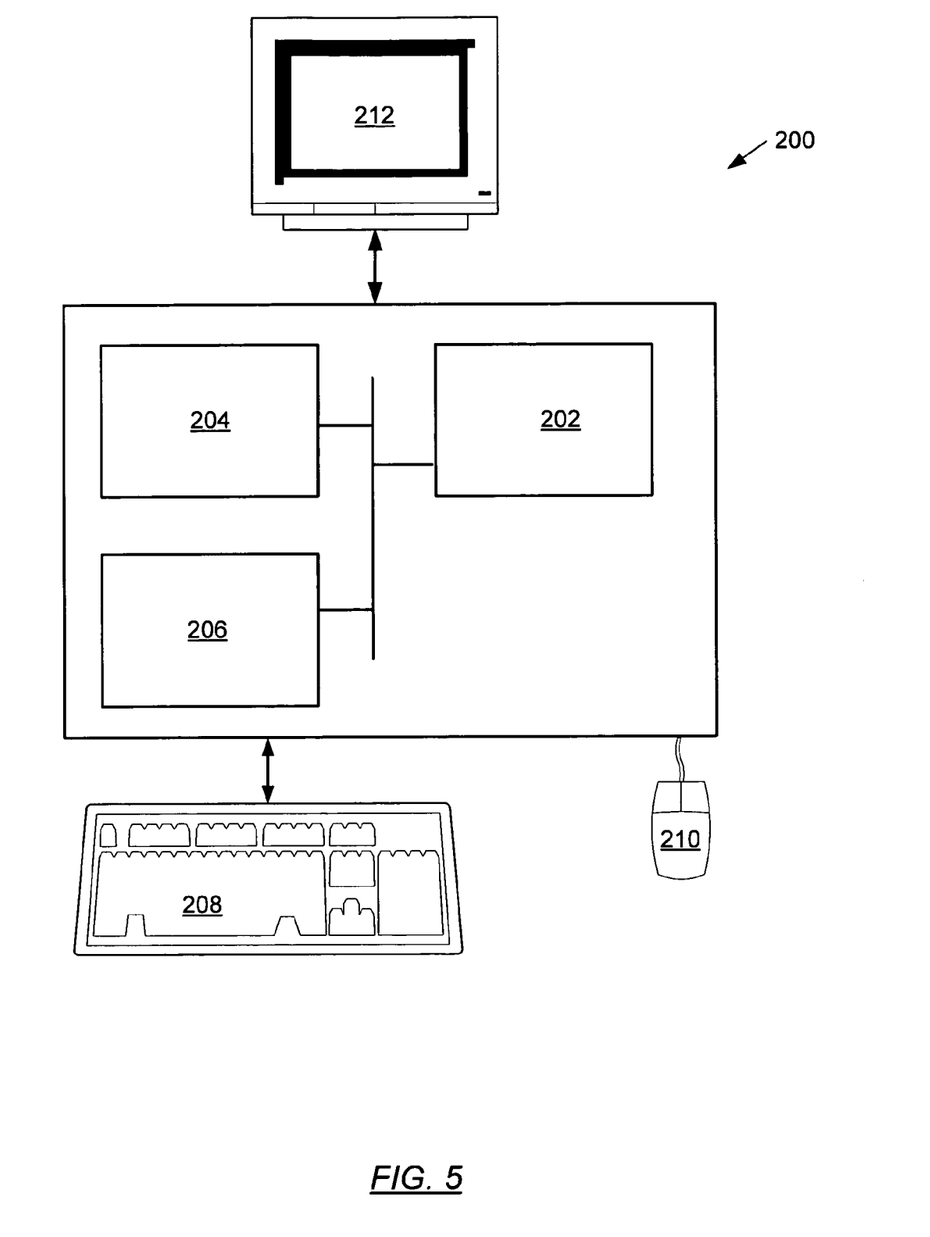
FIG. 5 shows a computer system in accordance with one embodiment of the invention.

The invention may be implemented on virtually any type of computer regardless of the platform being used. For example, as shown in FIG. 5, a computer system (200) includes a processor (202), associated memory (204), a storage device (206), and numerous other elements and functionalities typical of today's computers (not shown). The computer (200) may also include input means, such as a keyboard (208) and a mouse (210), and output means, such as a monitor (212). The computer system (200) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (200) may be located at a remote location and connected to the other elements over a network. Further, the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for integrating dimensional analysis in a program comprising:
    defining a specific dimension class within the program, wherein the specific dimension class is an instance of the dimension meta-class;
    defining an instantiation of a unit class within the program, wherein the instantiation of the unit class comprises the specific dimension class as a type parameter associated with the instantiation of the unit class;
    defining a method within the program using the instantiation of the unit class and the specific dimension class; and
    compiling the program to generate an executable code corresponding to the program,
    wherein the program is written in an object-oriented language.

2. The method of claim 1, further comprising:
    defining an instantiation of a measurement class within the program, wherein the instantiation of the measurement class comprises the specific dimension class and the instantiation of the unit class as type parameters associated with the instantiation of the measurement class.

3. The method of claim 2, wherein the instantiation of the measurement class is derived from a generic measurement class.

4. The method of claim 2, wherein a zero quantity is a wildcard instantiation of the generic measurement class.

5. The method of claim 1, further comprising:
    defining an instantiation of a PrimaryUnit class within the program, wherein the instantiation of the PrimaryUnit class comprises the specific dimension class as a type parameter associated with the instantiation of the PrimaryUnit class.

6. The method of claim 5, wherein the instantiation of the PrimaryUnit class is derived from a generic PrimaryUnit class.

7. The method of claim 1, further comprising:
defining an interface within the program, wherein the interface comprises a type parameter associated with the specific dimension.

8. The method of claim 1, wherein the instantiation of the unit class is derived from a generic unit class.

9. The method of claim 1, wherein the dimension meta-class is a generic class.

10. The method of claim 9, wherein the dimension meta-class is an abelian class.

11. The method of claim 10, wherein the abelian class is only implemented using an instance class.

12. The method of claim 11, wherein the instance class comprises an identity element as a type parameter associated with the instance class.

13. The method of claim 12, wherein the instance class comprises at least one selected from the group consisting a binary operator and a repetition operator as type parameters associated with the instance class.

14. The method of claim 1, wherein the instantiation of the unit class comprises a constructor configured to call a static block.

15. The method of claim 1, wherein compiling the program comprises statically checking the program using the type parameter associated with the instantiation of the unit class.

16. The method of claim 1, wherein compiling the program comprises statically checking the program using canonicalization for any instance class in the program that is an abelian class.

17. A computer system for integrating dimensional analysis in a program, comprising:
a processor;
a memory operatively connected to the processor; and
a compiler stored in the memory comprising software instructions to compile a program,
wherein the program comprises:
a specific dimension class, wherein the specific dimension class is an instance of a dimension meta-class;
an instantiation of a unit class, wherein the instantiation of the unit class comprises the specific dimension class as a type parameter associated with the instantiation of the unit class; and
a method within the program using the instantiation of the unit class and the specific dimension class,
wherein compiling the program generates an executable code corresponding to the program, and
wherein the program in written in an object-oriented language.

18. The computer system of claim 17, wherein the program further comprises:
an instantiation of a measurement class, wherein the instantiation of the measurement class comprises the specific dimension class and the instantiation of the unit class as type parameters associated with the instantiation of the measurement class.

19. The computer system of claim 18, wherein the instantiation of the measurement class is derived from a generic measurement class.

20. The computer system of claim 18, wherein a zero quantity is a wildcard instantiation of the generic measurement class.

21. The computer system of claim 17, wherein the compiler further comprises functionality to compile the program which further comprises:
an instantiation of a PrimaryUnit class, wherein the instantiation of the PrimaryUnit class comprises the specific dimension class as a type parameter associated with the instantiation of the PrimaryUnit class.

22. The computer system of claim 20, wherein the instantiation of the PrimaryUnit class is derived from a generic PrimaryUnit class.

23. The computer system of claim 17, wherein the compiler further comprises functionality to compile the program which further comprises:
an interface, wherein the interface comprises a type parameter associated with the specific dimension.

24. The computer system of claim 17, wherein the instantiation of the unit class is derived from a generic unit class.

25. The computer system of claim 1, wherein the dimension meta-class is a generic class.

26. The computer system of claim 25, wherein the dimension meta-class is an abelian class.

27. The computer system of claim 26, wherein the abelian class is only implemented using a instance class.

28. The computer system of claim 27, wherein the instance class comprises an identity element as a type parameter associated with the instance class.

29. The computer system of claim 27, wherein the instance class comprises at least one selected from the group consisting of a binary operator and a repetition operator as type parameters associated with the instance class.

30. The computer system of claim 17, wherein the instantiation of the unit class comprises a constructor configured to call a static block.

31. The computer system of claim 17, wherein compiling the program comprises statically checking the program using the type parameter associated with the instantiation of the unit class.

32. The computer system of claim 17, wherein compiling the program comprises statically checking the program using canonicalization for any instance class in the program that is an abelian class.

33. A computer readable medium comprising software instructions to compile a program, wherein the program comprises:
a specific dimension class, wherein the specific dimension class is an instance of a dimension meta-class;
an instantiation of a unit class, wherein the instantiation of the unit class comprises the specific dimension class as a type parameter associated with the instantiation of the unit class; and
a method within the program using the instantiation of the unit class and the specific dimension class,
wherein software instructions to compile the program comprise software instructions to statically check the program using the type parameter associated with the instantiation of the unit class,
wherein the program in written in an object-oriented language.

34. A method for integrating dimensional analysis in a program comprising:
instantiating a dimension class using a dimension meta-class,
instantiating a unit class comprising the instantiated dimension class as a type parameter associated with the instantiation of the unit class; and
executing a method within the program using the instantiated unit class and the instantiated dimension class,
wherein the program is written in an object-oriented language.

35. The method of claim 34, further comprising:
instantiating a measurement class comprising the instantiated dimension class and the instantiated unit class as type parameters.

* * * * *